United States Patent
Buthker (10) Patent No.: US 8,552,705 B2
(45) Date of Patent: Oct. 8, 2013

(54) LOWER POWER CONTROLLER FOR DC TO DC CONVERTERS

(75) Inventor: Henricus Cornelis Johannes Buthker, Mierlo (NL)

(73) Assignee: ST-Ericsson SA, Plan-les-Ouates (CH)

( * ) Notice: Subject to any disclaimer, the term of this patent is extended or adjusted under 35 U.S.C. 154(b) by 492 days.

(21) Appl. No.: 12/734,529

(22) PCT Filed: Nov. 10, 2008

(86) PCT No.: PCT/EP2008/065238
§ 371 (c)(1),
(2), (4) Date: Sep. 13, 2010

(87) PCT Pub. No.: WO2009/060098
PCT Pub. Date: May 14, 2009

(65) Prior Publication Data
US 2011/0001460 A1    Jan. 6, 2011

(30) Foreign Application Priority Data
Nov. 9, 2007 (EP) .................................... 07120341

(51) Int. Cl.
G05F 1/40 (2006.01)
G05F 1/613 (2006.01)

(52) U.S. Cl.
USPC ............ 323/288; 323/225; 323/285; 323/299

(58) Field of Classification Search
USPC ......... 323/222, 225, 271, 299–301, 282–285, 323/351
See application file for complete search history.

(56) References Cited

U.S. PATENT DOCUMENTS

| 6,930,526 | B1 | 8/2005 | Silva | |
|---|---|---|---|---|
| 7,026,796 | B2 * | 4/2006 | Suzuki | 323/224 |
| 7,786,712 | B2 * | 8/2010 | Williams | 323/266 |
| 7,812,579 | B2 * | 10/2010 | Williams | 323/266 |
| 7,969,131 | B2 * | 6/2011 | Reberga et al. | 323/273 |
| 2003/0222627 | A1 * | 12/2003 | Hwang | 323/222 |
| 2006/0061337 | A1 | 3/2006 | Kim et al. | |

FOREIGN PATENT DOCUMENTS

| JP | 2005160198 | 6/2005 |
|---|---|---|
| JP | 2006230167 | 8/2006 |
| KR | 1020040103610 A | 12/2004 |

OTHER PUBLICATIONS

International Search Report dated May 7, 2009 in connection with International Patent Application No. PCT/EP2008/065238.
Written Opinion of the International Searching Authority dated May 7, 2009 in connection with International Patent Application No. PCT/EP2008/065238.

* cited by examiner

*Primary Examiner* — Jessica Han
(74) *Attorney, Agent, or Firm* — Coats & Bennett, P.L.L.C.

(57) ABSTRACT

The present invention relates to a DC to DC converter system (100), which comprises converter means (110) and control means (120). The switching sequence of the first, second and third switching means (S1, S2, S3) is controlled by the control means (120) in such a manner that, during the on-time of the second switching device (S2), the first current (I1) that flows through the inductive storage element (L) of the converter means (110) can be indirectly measured through the first voltage (VC1) across the capacitive storage element (C1), which is being charged with a second current (12) proportional to the input voltage (Vin) of the converter means (110) and provided by the current source (CS). Thus, the on-time of the second switching means (S2) varies inversely proportional to the input voltage (Vin).

30 Claims, 4 Drawing Sheets

LOWER POWER CONTROLLER FOR DC TO DC CONVERTERS

CROSS-REFERENCE TO RELATED APPLICATION(S)

The present application claims priority under 35 U.S.C. §365 to International Patent Application No. PCT/EP2008/065238 filed Nov. 10, 2008, entitled "LOW POWER CONTROLLER FOR DC TO DC CONVERTERS". International Patent Application No. PCT/EP2008/065238 claims priority under 35 U.S.C. §365 and/or 35 U.S.C. §119(a) to European Patent Application No. 07120341.8 filed Nov. 9, 2007 and which are incorporated herein by reference into the present disclosure as if fully set forth herein.

FIELD OF THE INVENTION

The present invention relates to a DC to DC converters, and more particularly to a low power controller for DC to DC converters exhibiting an on-time variable according to the input voltage of the DC to DC converters.

BACKGROUND OF THE INVENTION

Regulated or controlled power supplies are found in virtually all electronic devices, including for example battery chargers, cellular telephones, computers, computer monitors, televisions, audio equipment, video cameras, navigation devices or portable media players. A typical power supply is a converter, such as a direct current to direct current converter (in the following simply designated as DC to DC converter). The DC to DC converter accepts a DC input voltage and produces a DC output voltage. Typically, the (mean) output voltage produced is at a higher or lower value than the input voltage according to whether a up converter, sometimes called a boost or step-up converter, or a down converter, sometimes called a buck or step-down converter, is respectively used.

Using a technique called "synchronous rectification", DC to DC converters are preferably implemented as synchronous DC to DC converters in a switched operating mode, while replacing the rectifying means such as the common flywheel diode usually connected in series with inductive energy storage means, such as external coils or inductors, by switching means, such as transistors. Thus, such a synchronous DC to DC converter usually comprises at least inductive energy storage means and switching means, the switching sequence of which is controlled by control means for providing electrical energy from the inductive energy storage means to the output of the synchronous DC to DC converter.

Most of these control means currently operate either at fixed frequency in Pulse Width Modulation (PWM) or continuous mode, when the inductor current is continuous while never reaching a zero value, or at variable frequency in Pulse Frequency Mode (PFM) or discontinuous mode, when the inductor current is discontinuous while pulsing from a zero value to a positive value.

The control means operating in PWM mode are rather suitable for relatively high output load, whereas those operating in PFM mode are rather suitable for relatively low output load. They also present the advantage to provide better performance than those operating in PFM mode, but the disadvantage to require a more complex circuit structure.

In PFM mode, the control means for up converters are controlled in peak current, which may disadvantageously be very high, and are required to have a fixed on-time.

There are also hysteretic controllers, but these are rather suitable for down converters, since a hysteretic up converter would require a means of sensing the inductor current that would cost power and be difficult to realize at high frequencies due to ringing and spikes on the inductor voltage.

SUMMARY OF THE INVENTION

It is therefore an object of the present invention to provide a DC to DC converter system capable to operate in PFM mode with a variable on-time, while saving power consumption, being immune to noise at high frequencies, and being designed with a reduced number of external components.

This object is achieved by a DC to DC converter system as claimed in claim 1, and a method as claimed in claim 16.

According to a first aspect of the invention, the DC to DC converter system comprises converter means for converting an input voltage into an output voltage, and control means for controlling first and second switching means via an opposite switching sequence.

The converter means comprises at least an inductive storage element, which is connected in such a manner that the input voltage of the converter means is across it when the second switching means is turned on. Therefore, the first current through the inductive storage element exhibits a slope proportional to the input voltage.

The converter means further comprises first and second switching means, such that the converter means acts as a synchronous DC to DC converter.

The control means is configured to modulate an on-time of the second switching means according to the input voltage of the converter means. Thus, the corresponding on-time is not fixed, but variable.

According to a second aspect of the invention, this object is achieved by a corresponding method for modulating the on-time of the second switching means according to the input voltage in the converter means such as specified in claim 1, said method comprising at least the step of replicating the first current as a first voltage across a capacitive storage element during the on-time of the second switching means, the on-time being defined as a time period during which the second switching means is turned on.

In the following, advantageous embodiments will be described, which are also defined in the dependent claims. The embodiments can be combined with each other, unless explicitly stated otherwise.

The control means may be configured to replicate the first current through the inductive storage element as a first voltage across a capacitive storage element when the second switching means are turned on. Thereby, the first current is indirectly measured, and the first voltage varies in time with a slope proportional to the input voltage of the converter during the on-time.

This configuration may be carried out using a current source, connected between a first input terminal of said converter means and the capacitive storage element, which provides a second current varying proportionally to the input voltage of the converter means and third switching means, connected across the capacitive storage element, which has a switching sequence opposite to that of the second switching means. Thereby, the capacitive storage element is being charged with the second current during the on-time.

The control means may further comprise drive means for driving the first, second and third switching means and enabling the capacitive storage element to discharge when the second switching means are turned off and inversely to charge when the second switching means are turned on. Thus, the on-time is defined as corresponding to the charge period of the capacitive storage element.

The control means may also comprise first comparator means that transmit a first comparison signal to the first input of the drive means, when the first voltage reaches increasingly the first reference voltage. Thus, the discharge period of the capacitive storage element can start.

The control means may also comprise second comparator means for comparing a voltage signal proportional to the output voltage of the converter means with a second reference voltage.

In an embodiment, the second comparator means may transmit a second comparison signal to the second input of the drive means when a voltage signal proportional to the output voltage of the converter means reaches decreasingly a second reference voltage. Thus, the charge period of the capacitive storage element can start again, with a value of the first current that may be not equal to zero.

In another embodiment, the DC to DC converter system may operate in pulse frequency modulation (PFM) mode, such that the first current through the inductive storage element can reach a zero value. Thereby, the occurrence of a right-half plane (RHP) zero can be avoided for getting a better stability of the DC to DC converter system at high currents and during the duty cycles of the switching means, and the inductive storage element can be minimized.

In PFM mode, the control means may further comprise detector means for detecting the zero current of the inductive storage element.

In PFM mode, the second comparator means may also transmit the second comparison signal to an input of a AND gate configured in such a manner that the AND gate transmits an output signal to the second input of the drive means under condition that the voltage signal proportional to the output voltage of the converter means reaches decreasingly the second reference voltage and a zero current through the inductive storage element is detected. Thus, the first current is always zero when the charge period of the capacitive storage element starts again, such that the inductive storage element never goes into saturation and exhibits a peak value of the first current always constant.

Moreover, the first reference voltage may be chosen to correspond to the maximum value of the first current, such that it is possible to indirectly control the peak current of the first current.

The control means may additionally comprise counter means for ensuring that the off-time of the second switching means is sufficiently large for enabling the capacitive storage element to fully discharge through the third switching means. Thereby, the first voltage across the capacitive storage element is always zero when the corresponding charge period starts again.

The first current may preferably have a peak value much greater than the second current delivered by the current source, such that the replica of the first current is carried out by means of a small-signal circuit, which saves power.

The drive means may be a set-reset flip flop, which is set and reset respectively by a set and reset signal issued from comparator means. Thereby, a digital control means using a high-frequency clock for controlling the set-reset flip flop and indirectly the switching sequence of the switching means, is not needed, such that power can be saved.

Additionally, the converter means may be an up converter, down converter, flyback converter or any combination of them.

BRIEF DESCRIPTION OF THE DRAWINGS

The present invention will be now described based on preferred embodiments with reference to the accompanying drawings in which.

DETAILED DESCRIPTION OF EMBODIMENTS

Figure 1:
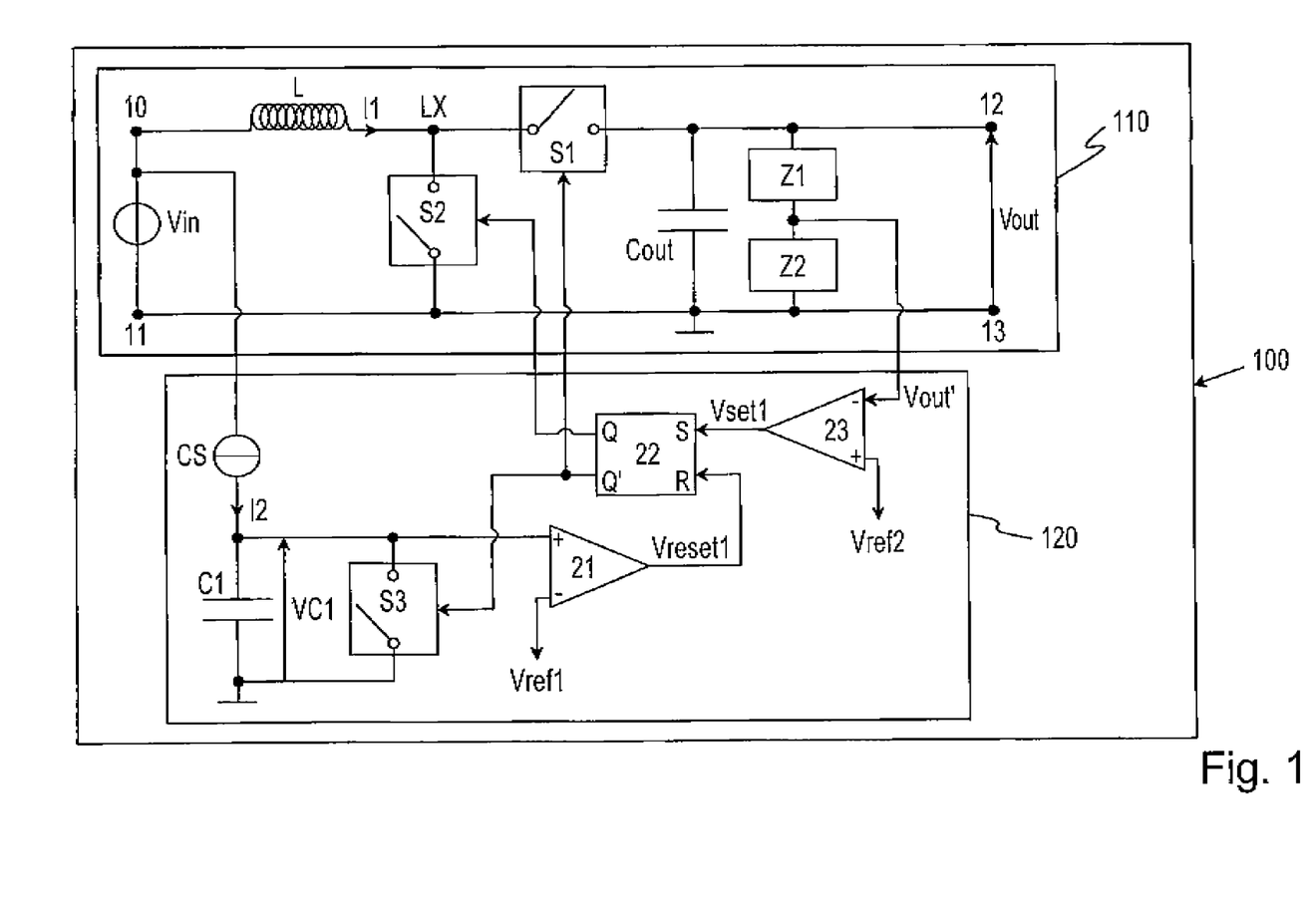
FIG. 1 shows a schematic diagram of a DC to DC converter system without zero current detection according to a first embodiment of the present invention.

FIG. 1 is a schematic diagram of a DC to DC converter system 100 without zero current detection according to a first embodiment of the present invention. The DC to DC converter system 100 comprises a synchronous up DC to DC converter 110 for converting an input voltage Vin (e.g. battery voltage) across the input terminals 10, 11 into a higher regulated output voltage Vout across the output terminals 12, 13, and a control circuit 120 for regulating the output voltage Vout through a switch mode.

Such DC to DC converter 110 also comprises switching devices S1, S2 driven by the control circuit 120 with an opposite switching sequence, which may be transistors (e.g. MOSFET, BJT) or any other controllable semiconductor switching devices, and an external inductor L for storing energy in the magnetic field generated by the current I1 that flows through it and avoiding to short-circuit the input voltage Vin when the switching device S2 is turned on.

The control circuit 120 contains a capacitor C1 across which the switching device S3 is connected, a current source CS connected between the input terminal 10 and the capacitor C1 that delivers a small current I2 proportional to the input voltage Vin (e.g. I2=Vin*10 µA), a first comparator 21 for comparing the voltage VC1 across the capacitor C1 with a reference voltage Vref1 that may be chosen equivalent to the maximum rated current I1 in the inductor L, a set-reset flip flop 22 having two inputs R and S, and two reverse outputs Q and Q' for controlling both the switching devices S1 and S3 according to a switching sequence from the output Q' and the switching device S2 according to an opposite switching sequence from the output Q, and a second comparator 23 for comparing a voltage Vout' proportional to the output voltage through a voltage divider Z1, Z2, namely Vout'=Vout*(Z2/Z1+Z2) where Z1 and Z2 are impedances (e.g. Z1 and Z2 may be a R-C combination with Z1=3 Z2 resulting in Vout=4*Vout'), with a reference voltage Vref2.

When the switching device S2 is turned on, the switching device S3 is turned off, and the capacitor C1 is being charged by the current I2 provided by the current source CS. The voltage VC1 across the capacitor C1 varies in time proportionally to the input voltage Vin until increasingly reaching the reference voltage Vref1. The first comparator 21 then outputs a comparison signal Vreset1, e.g. pulse signal, which is sent towards the reset input R of the set-reset flip flop 22. Being now reset, the set-reset flip flop 22 thus commands the switching devices S3 and S1 to be turned on and the switching device S2 to be turned off. During the off-time of the second switching device S2, which is defined as the time period during which the switching device S2 is turned off, the capacitor C1 discharges through the switching device S3 with a time constant τ=R*C, where R is the resistance value of the switching device S3 and C is the capacitance value of the capacitor C1.

When the voltage Vout' decreasingly reaches the reference voltage Vref2, the second comparator 23 outputs a comparison signal Vset1, e.g. pulse signal, which is sent towards the set input S of the set-reset flip flop 22. Being in turn set, the set-reset flip flop 22 commands this time the switching devices S3 and S1 to be turned off again and the switching device S2 to be turned on again. During the on-time of the second switching device S2, the capacitor C1 is being charged by the current I2 provided by the current source CS, such that the voltage VC1 across the capacitor C1 increases with a slope I2/C1 proportional to Vin, whereas the current I1 through the inductor L increases also proportionally to Vin with a slope Vin/L.

Thus, the on-time of the switching device S2, which is defined as the time period during which the switching device S2 is turned on, varies inversely proportional to the input voltage Vin, starting when the set-reset flip flop 22 is set and ending when the set-reset flip flop 22 is reset.

Thus, no digital control circuit 120 requiring a high-frequency clock through a high-speed oscillator is needed, since the set-reset flip flop 22 and indirectly the switching sequence of the switching devices S1, S2, S3, are controlled by the outputs of the first and second comparators 21, 23.

Figure 2:
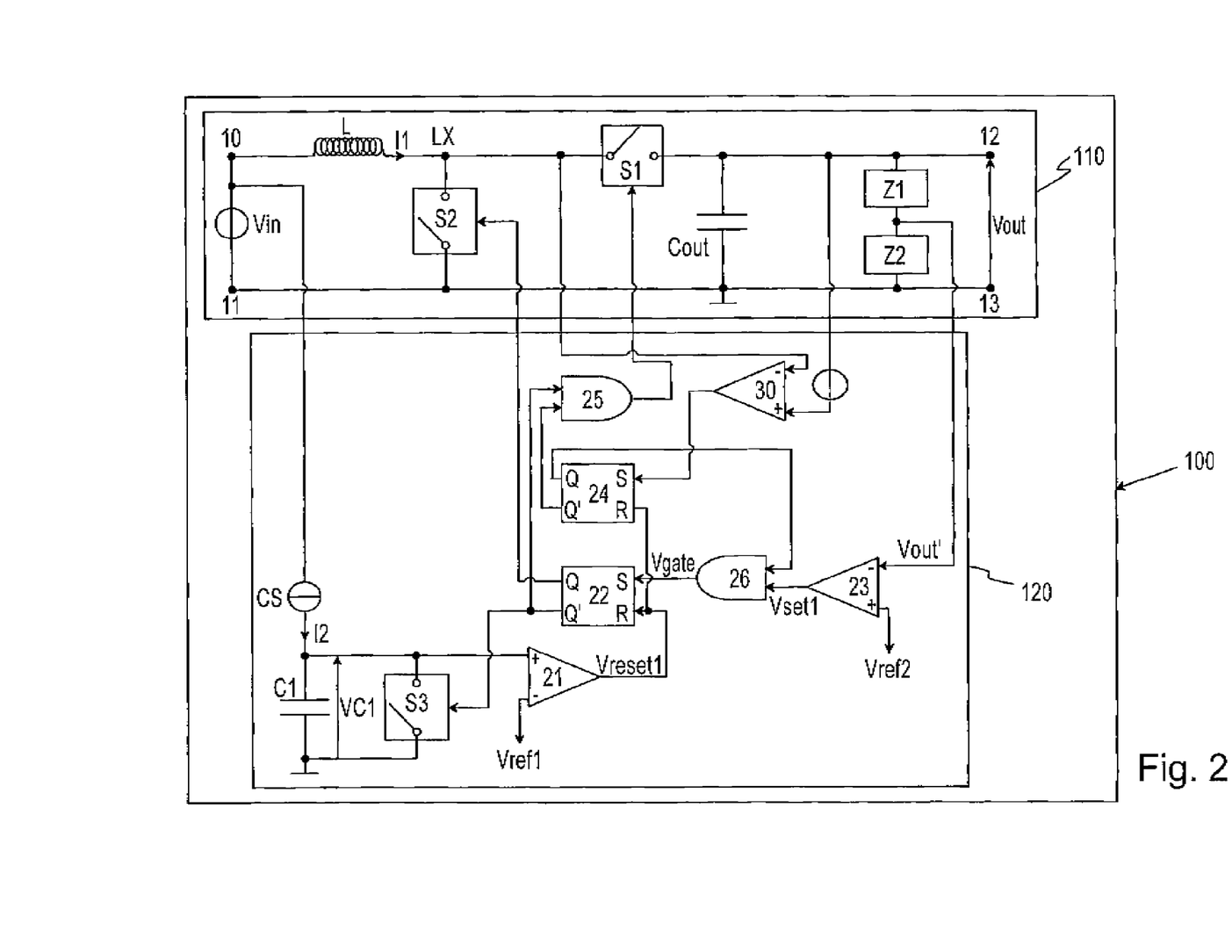
FIG. 2 shows a schematic diagram of a DC to DC converter system with zero current detection according to a second embodiment of the present invention when in PFM mode.

FIG. 2 depicts a schematic diagram of a DC to DC converter system 100 with zero current detection according to a second embodiment of the present invention when in PFM mode. The DC to DC converter system 100 of FIG. 2 comprises the synchronous up DC to DC converter 110 of FIG. 1 and the control circuit 120 of FIG. 1 with the addition of a second set-reset flip flop 24, two AND gates 25, 26, and a third comparator 30 for detecting a zero current through the inductor L.

In this second embodiment, the DC to DC converter system 100 is now supposed to operate in PFM mode, such that the current I1 passing through the inductor L is supposed to have sufficient time in order to reach a zero value.

Like the first embodiment of FIG. 1, the set-reset flip flop 22 is reset after the voltage VC1 across the capacitor C1 increasingly reaches the reference voltage Vref1. Nevertheless, this second embodiment differs from the first one in that the comparison signal Vreset1 is not only sent towards the reset input R of the set-reset flip flop 22 but also towards the reset input R of another set-reset flip flop 24, and in that the output Q' of the set-reset flip flop 22 commands not only the switching device S3 but also one of the two inputs of the AND gate 25, the other input being commanded by the output Q' of the set-reset flip flop 24. Additionally, the comparison signal Vset1, which is output by the comparator 23 when the voltage Vout' decreasingly reaches the reference voltage Vref2, is transmitted to one of the two inputs of another AND gate 26, the other input being connected to the output Q of the other set-reset flip flop 24. The set input S of the set-reset flip flop 22 is also configured to receive the output signal Vgate of the AND gate 26, while the set input S of the other set-reset flip flop 24 is configured to receive the comparison signal issued by the third comparator 30 when the current I1 through the inductor L is zero or close to zero. As depicted in FIG. 2, this zero current detection is carried out by comparing the voltage measured at the terminal LX with a low reference voltage, e.g. 4 mV, delivered by a voltage source VS, but it may also be carried out by comparing the voltage measured across a low resistance, e.g. 5 mΩ, connected in series with the output capacitor Cout of the synchronous up DC to DC converter 110, with the voltage at the grounded terminal 11. Despite the fact that the third comparator 30 is connected to the power circuit with all its drawbacks, such as large input components to withstand the high voltages across the inductor L, sensitivity to ringing on the terminal LX and large delay, the former zero current detection method nevertheless seems better than the latter that leads to more ripples and less efficiency. It is also noted that the use of this third comparator 30 as zero current detector, is less critical than its use as peak current detector, since it will not cause the inductor L to go into saturation whether it switches too early or too late.

Once both set-reset flip flops 22 and 24 are reset by the comparison signal Vreset1, the set-reset flip flop 22 commands the switching device S3 to be turned on through its output Q', the switching device S2 to be turned off through its output Q, and, in combination with the other set-reset flip flop 24, the switching device S1 to be turned on through the output signal of the AND gate 25. During the off-time of the second switching device S2, the capacitor C1 discharges through the switching device S3, as described in the aforementioned passage related to FIG. 1.

The set-reset flip flop 24 is set by the comparison signal transmitted by the third comparator 30 when the current I1 through the inductor L is detected to be zero. As for the set-reset flip flop 22, it is then set by the output signal Vgate transmitted by the AND gate 26 when the voltage Vout' decreasingly reaches the reference voltage Vref2 and the current I1 through the inductor L is detected to be zero. Being in turn set, the set-reset flip flop 22 commands the switching device S3 to be turned off through its output Q', the switching device S2 to be turned on through its output Q, and, in combination with the other set-reset flip flop 24, the switching device S1 to be turned off through the output signal of the AND gate 25. During the on-time of the second switching device S2, the capacitor C1 is being charged by the current I2 provided by the current source CS, such that the voltage VC1 across the capacitor C1 increases with a slope I2/C1 proportional to Vin, and the current I1 through the inductor L increases also proportionally to Vin with a slope Vin/L while starting always from zero, which enables the current I1 through the inductor L to have a peak value maintained constant and thus to ensure best use of the inductor L.

Thus, the on-time of the switching device S2 varies inversely proportional to the input voltage Vin, starting when the set-reset flip flops 22 and 24 are set and ending when the set-reset flip flop 22 is reset.

Thus, no digital control circuit 120 requiring a high-frequency clock through a high-speed oscillator is needed, since the set-reset flip flops 22, 24 and indirectly the switching sequence of the switching devices S1, S2, S3, are controlled by the outputs of the first, second and third comparators 21, 23, 30.

Figure 3:
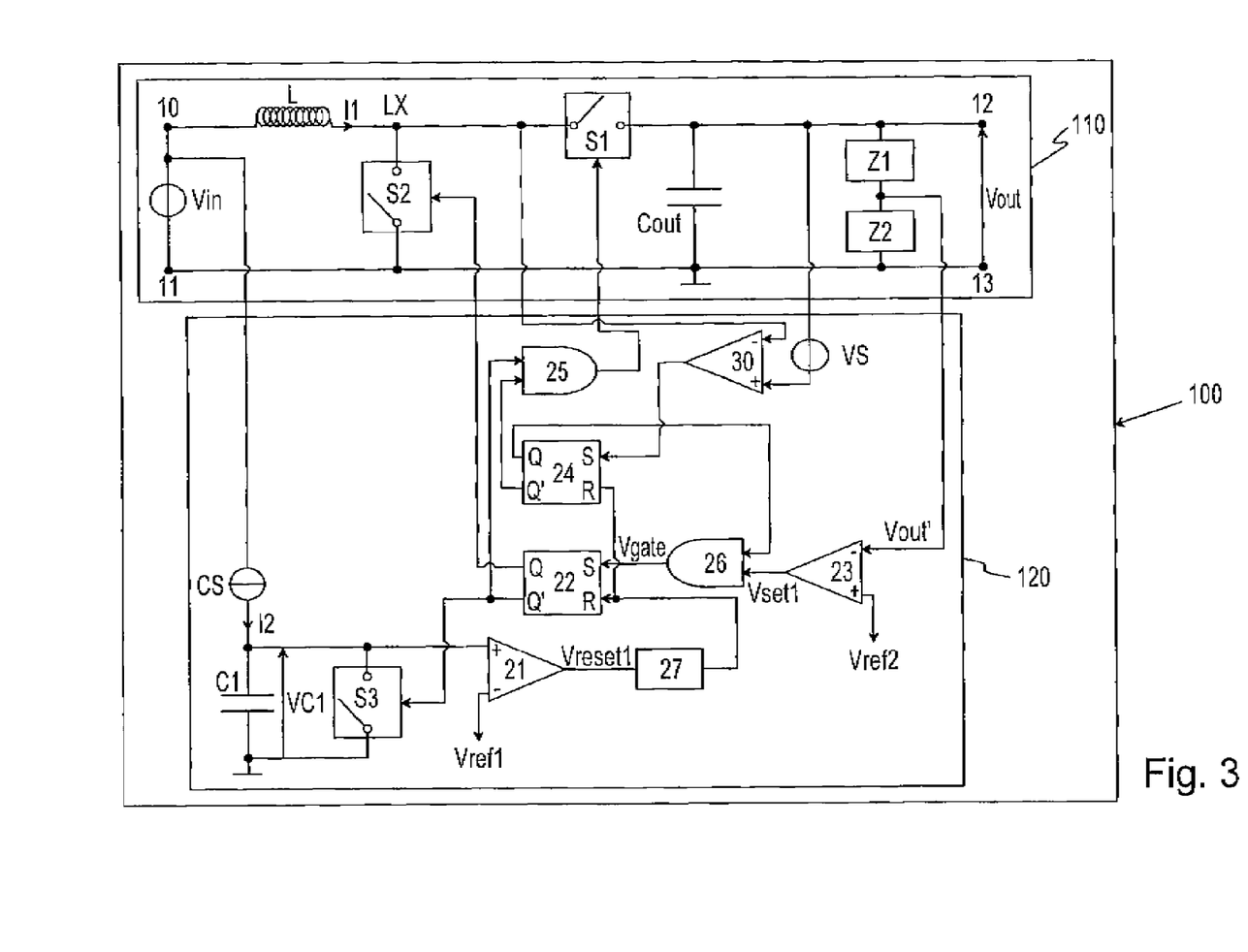
FIG. 3 shows a schematic diagram of a DC to DC converter system according to a variant to the second preferred embodiment of FIG. 2, wherein a counter is implemented.

FIG. 3 shows a schematic diagram of a DC to DC converter system according to a variant to the second preferred embodiment of FIG. 2, wherein a counter 27 is implemented.

The DC to DC converter system 100 of FIG. 3 comprises the synchronous up DC to DC converter 110 of FIG. 2 and the control circuit 120 of FIG. 2 with the addition of a counter 27 connected between the output of the first comparator 21 and the reset input R of the set-reset flip flop 22. The counter 27 allows the capacitor C1 to have sufficient time to fully discharge during the off-time of the switching device S2, while maintaining the switching device S2 turned off, in other terms the set-reset flip flop 22 reset, during a minimum time period counted and possibly fixed by the counter 27, e.g. a minimum off-time one-shot. The set-reset flip flops 22 and 24 will be thus set, after the capacitor C1 is fully discharged, when the voltage Vout' decreasingly reaches the reference voltage Vref2 and the current I1 through the inductor L is detected to be zero. In this variant to the second embodiment of FIG. 2, the voltage VC1 across the capacitor C1 will hence start always from zero, like the current I1 through the inductor L.

Figure 4:
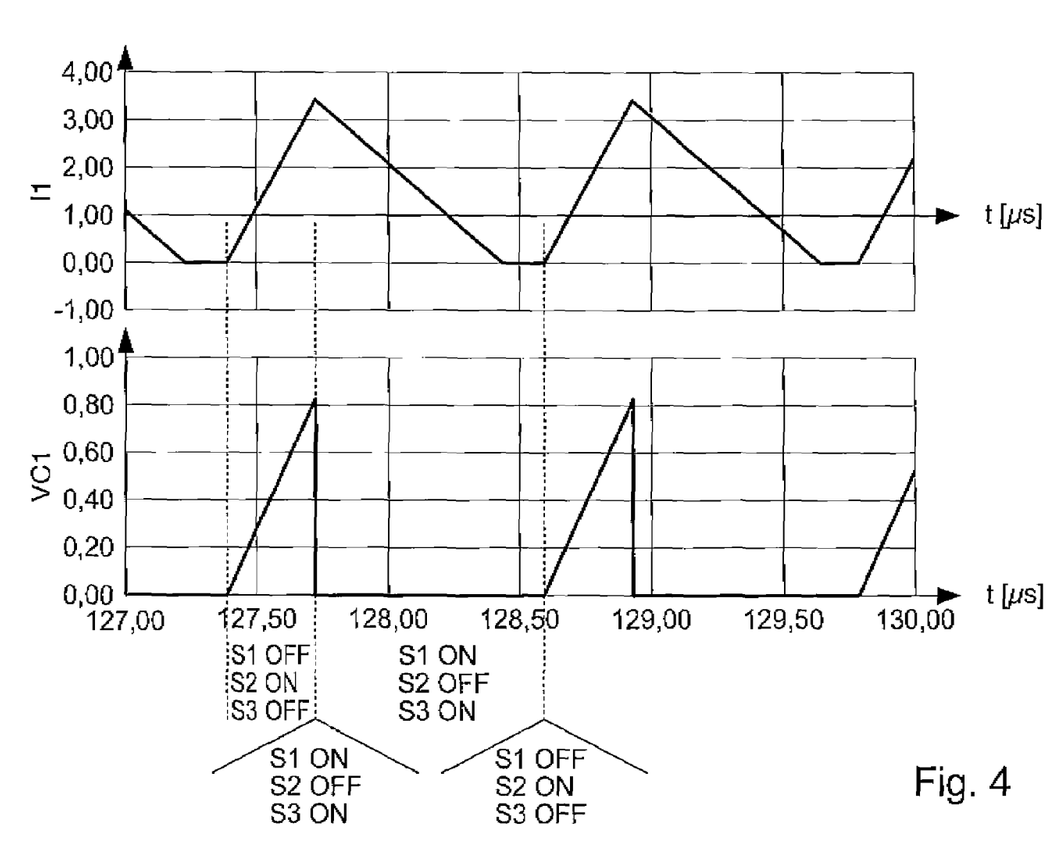
FIG. 4 shows the time diagrams illustrating the current I1 through the inductor L and the voltage VC1 across the capacitor C1 of FIG. 3.

FIG. 4 shows the time diagrams illustrating the current I1 through the inductor L and the voltage VC1 across the capacitor C1 of FIG. 3, wherein the current I1 through the inductor L and the voltage VC1 across the capacitor C1 increases, starting from zero, according to a slope proportional to the input voltage Vin, during the on-time of the switching device S2.

Furthermore, it should be noted that the present invention is not limited to any particular synchronous DC to DC up converter. Rather, the invention is more generally applicable to any up converter, down converter, flyback converter or combination of such converters.

Additionally, the DC to DC converter system 100 operating in accordance with the principles of the present invention, may be used in all battery powered devices, such as cellular phones, portable media players and navigation devices.

In summary, a DC to DC converter system 100, which comprises converter means 110 and control means 120, has been described. The switching sequence of the first, second and third switching means S1, S2, S3 is controlled by the control means 120 in such a manner that, during the on-time of the second switching device S2, the first current I1 that flows through the inductive storage element L of the converter means 110 can be indirectly measured through the first voltage VC1 across the capacitive storage element C1, which is being charged with a second current I2 proportional to the input voltage Vin of the converter means 110 and provided by the current source CS. Thus, the on-time of the second switching means S2 varies inversely proportional to the input voltage Vin.

Finally but yet importantly, it is noted that the term "comprises" or "comprising" when used in the specification including the claims is intended to specify the presence of stated features, means, steps or components, but does not exclude the presence or addition of one or more other features, means, steps, components or group thereof. Further, the word "a" or "an" preceding an element in a claim does not exclude the presence of a plurality of such elements. Moreover, any reference sign does not limit the scope of the claims.

The invention claimed is:

1. A DC to DC converter system for modulating an on-time, said DC to DC converter system comprising:
   a) converter means for converting an input voltage into an output voltage, wherein said converter means comprises at least:
   first and second input terminals, said input voltage being applied at said first and second input terminals;
   first and second output terminals, said second output terminal being connected to said second input terminal;
   an inductive storage element, said inductive storage element being passed through by a first current;
   first switching means connected to provide a conduction path from said inductive storage element towards said first output terminal;
   second switching means connected to provide a conduction path from said inductive storage element and said first switching means towards said second input terminal, said input voltage being across said inductive storage element when said second switching means is turned on, said second switching means having a switching sequence opposite to that of said first switching means; and
   b) control means comprising a capacitive storage element for controlling said opposite switching sequence of said first and second switching means, wherein said on-time of said second switching means is modulated by said input voltage, said on-time being defined as a time period during which said second switching means is turned on, said control means being configured to replicate said first current as a first voltage across the capacitive storage element during said on-time of said second switching means.

2. A DC to DC converter system according to claim 1, wherein said converter means is at least a one of an up converter or a down converter or flyback converter.

3. A DC to DC converter system according to claim 1, wherein said control means comprises at least:
   a current source for delivering a second current that varies proportionally to said input voltage, said variable current source being connected between said first input terminal and said capacitive storage element;
   third switching means connected across said capacitive storage element
   and configured to have a switching sequence identical to that of said first switching means.

4. A DC to DC converter system according to claim 3, wherein said control means comprises at least:
   drive means for driving said first, second and third switching means, said drive means having a first and second input and being configured to receive a reset signal at said first input for enabling said capacitive storage element to discharge during an off-time of said second switching means, and a set signal at said second input for enabling said capacitive storage element to charge during said on-time of said second switching means, said off-time being defined as a time period during which said second switching means is turned off.

5. A DC to DC converter system according to claim 4, wherein said control means further comprises:
   first comparator means for comparing said first voltage with a first reference voltage, said first comparator means outputting a first comparison signal that is sent to said first input when said first voltage reaches increasingly said first reference voltage, said first comparison signal being said reset signal.

6. A DC to DC converter system according to claim 5, wherein said control means further comprises:
   second comparator means for comparing a voltage signal proportional to said output voltage with a second reference voltage, said second comparator means outputting a second comparison signal.

7. A DC to DC converter system according to claim 6, wherein said second comparator means sends said second comparison signal to said second input when said voltage signal reaches decreasingly said second reference voltage, said second comparison signal being said set signal.

8. A DC to DC converter system according to claim 6, wherein said DC to DC converter system operates in a pulse frequency modulation mode.

9. A DC to DC converter system according to claim 8, wherein said control means further comprises detector means for detecting a zero current through said inductive storage element.

10. A DC to DC converter system according to claim 9, wherein said control means further comprises:
an AND gate 26, said AND gate 26 being configured to send an output signal
to said second input when said voltage signal reaches decreasingly said second reference voltage and said detector means detects a zero current, said output signal being said set signal.

11. A DC to DC converter system according to claim 5, wherein said first reference voltage corresponds to a maximum value of said first current (Il).

12. A DC to DC converter system according to claim 11, wherein said control means further comprises counter means for ensuring that said off-time is at least equal to a predetermined time, said predetermined time being defined for enabling said capacitive storage element to fully discharge through said third switching means.

13. A DC to DC converter system according to claim 12, wherein said drive means is a set-reset flip flop, said set-reset flip flop being set by said set signal and reset by said reset signal.

14. A DC to DC converter system according to claim 3, wherein said first current has a peak value much greater than said second current.

15. A method of controlling a DC to DC converter including an inductive storage element, a first switching element, and a second switching element, said method comprising:
applying an input voltage to first and second input terminals of a converter circuit;
generating an output voltage at first and second output terminals of said converter circuit, said second output terminal being connected to said second input terminal;
closing a first switching element and opening a second switching element during a first operating phase;
directing a first current through an inductive storage element to a first output terminal in the first operating phase;
opening the first switching element and closing the second switching element during a second operating phase;
directing the first current through the inductive storage element to said second input terminal in the second operating phase;
charging a timing control capacitor during said second operating phase;
comparing, during the second operating phase, a first voltage proportional to a voltage across the timing control capacitor to a first reference voltage, said first voltage increasing during said second operating phase;
switching from the second operating phase to the first operating phase when the first voltage equals the first reference voltage;
comparing, during the first operating phase, a second voltage proportional to the output voltage to a second reference voltage, said second voltage increasing during the first operating phase; and
switching from the first operating phase to the second operating phase when the second voltage equals the second reference voltage.

16. The method of claim 15 wherein charging a timing control capacitor during said second operating phase comprises charging the timing control capacitor with a charging current that varies proportional to the input voltage.

17. The method of claim 15 further comprising discharging said timing control capacitor through a third switching element during the first operating phase.

18. The method of claim 17 wherein switching from the first operating phase to the second operating phase when the second voltage equals the second reference voltage comprises switching from the first operating phase to the second operating phase when the second voltage equals the second reference voltage and the first voltage is zero.

19. The method of claim 17 wherein switching from the first operating phase to the second operating phase when the second voltage equals the second reference voltage comprises switching from the first operating phase to the second operating phase when the second voltage equals the second reference voltage, the first voltage is zero, and the first current is zero.

20. The method of claim 15 wherein switching from the first operating phase to the second operating phase when the second voltage equals the second reference voltage comprises switching from the first operating phase to the second operating phase when the second voltage equals the second reference voltage, and the first current is zero.

21. The method of claim 15 wherein the first reference voltage corresponds to a maximum value of the first current.

22. The method of claim 15 wherein a duration of the second operating phase is inversely proportional to the input voltage.

23. A DC to DC converter comprising:
a converter circuit for converting an input voltage at first and second input terminals to an output voltage at first and second output terminals, said second output terminal being connected to said second input terminal, said converter circuit comprising:
an inductor connected between said first input terminal and the first output terminal;
a first switching element configured to close during a first operating phase to direct a first current through the inductor to said first output terminal;
a second switching element configured close during a second operating phase to direct the first current through the inductor to the second input terminal;
a control circuit comprising:
a timing control capacitor configured to charge during said second operating phase;
a logic circuit configured to:
compare, during the second operating phase, a first voltage proportional to a voltage across the timing control capacitor to a first reference voltage, said first voltage increasing during said second operating phase;
close the first switching element and open the second switching element when the first voltage equals the first reference voltage to switch the converter circuit to the first operating phase;
compare, during the first operating phase, a second voltage proportional to the output voltage to a second reference voltage; and
close the second switching element and open the first switching element when the second voltage equals the second reference voltage to switch the converter circuit to the second operating phase.

24. The DC to DC converter of claim 23 wherein the control circuit is configured to supply to the timing control capacitor a charging current that varies proportional to the input voltage.

25. The DC to DC converter of claim 23 wherein the control circuit comprises a third switching element configured to discharge said timing control capacitor during the first operating phase.

26. The DC to DC converter of claim 25 wherein the logic circuit is configured to switch the converter circuit from the first operating phase to the second operating phase when the second voltage equals the second reference voltage and the first voltage is zero.

27. The DC to DC converter of claim 25 further comprising a current detection circuit for detecting the first current, and wherein the logic circuit is configured to switch the converter circuit from the first operating phase to the second operating phase when the second voltage equals the second reference voltage, the first voltage is zero, and the first current is zero.

28. The DC to DC converter of claim 23 further comprising a current detection circuit for detecting the first current, wherein the logic circuit is configured to switch the converter circuit from the first operating phase to the second operating phase when the second voltage equals the second reference voltage, and the first current is zero.

29. The DC to DC converter of claim 23 wherein the first reference voltage corresponds to a maximum value of the first current.

30. The DC to DC converter of claim 23 wherein the control circuit is configured to vary a duration of the second operating phase inversely proportional to the input voltage.

* * * * *